United States Patent [19]
Davidson

[11] Patent Number: 5,930,062
[45] Date of Patent: Jul. 27, 1999

[54] ACTIVELY STABILIZED MAGNETORESISTIVE HEAD

[75] Inventor: Robert J. Davidson, Boise, Id.

[73] Assignee: Hewlett-Packard Company, Palo Alto, Calif.

[21] Appl. No.: 08/725,795

[22] Filed: Oct. 3, 1996

[51] Int. Cl.$^6$ .............................. G11B 5/02; G11B 5/39
[52] U.S. Cl. ............................................ 360/66; 360/113
[58] Field of Search .................................. 360/65, 66, 67, 360/46, 113; 324/207.21, 252; 338/32 R; 327/510; 323/368

[56] References Cited

U.S. PATENT DOCUMENTS

| | | | |
|---|---|---|---|
| 3,860,965 | 1/1975 | Voegeli | 360/113 |
| 4,343,026 | 8/1982 | Griffith et al. | 360/113 |
| 4,691,259 | 9/1987 | Imakoshi et al. | 360/113 |
| 5,079,831 | 1/1992 | Reid | 29/603 |
| 5,142,425 | 8/1992 | Gailbreath, Jr. et al. | 360/123 |
| 5,270,892 | 12/1993 | Naberhuis | 360/113 |
| 5,296,987 | 3/1994 | Anthony et al. | 360/113 |
| 5,309,304 | 5/1994 | Naberhuis et al. | 360/113 |
| 5,412,518 | 5/1995 | Christner et al. | 360/66 |
| 5,422,571 | 6/1995 | Gurney et al. | 324/252 |
| 5,436,777 | 7/1995 | Soeya et al. | 360/113 |
| 5,436,778 | 7/1995 | Lin et al. | 360/113 |
| 5,442,507 | 8/1995 | Koga et al. | 360/113 |
| 5,442,508 | 8/1995 | Smith | 360/113 |
| 5,444,589 | 8/1995 | Hu et al. | 360/113 |
| 5,446,613 | 8/1995 | Rottmayer | 360/113 |
| 5,701,222 | 12/1997 | Gill et al. | 360/113 |

FOREIGN PATENT DOCUMENTS

| | | |
|---|---|---|
| 0173942 | 3/1986 | European Pat. Off. . |
| 539081 A1 | 4/1993 | European Pat. Off. . |
| 57-92403 | 6/1982 | Japan . |
| 60-119616 | 6/1985 | Japan . |
| 60-119617 | 6/1985 | Japan . |
| 60-263310 | 12/1985 | Japan . |
| 2023326 | 12/1979 | United Kingdom . |

OTHER PUBLICATIONS

IEEE Transactions on Magnetics, "Analysis of a Dual Magnetoresistive Head", Smith et al, vol. 28, No. 5, Sep. 1992.
IEEE Transactions on Magnetics, "Dual Magnetoresistive Head for High Density Recording", Smith et al, vol. 28, No. 5, Sep. 1992.

*Primary Examiner*—David L. Ometz

[57] ABSTRACT

A computer comprising a data storage device for use with a magnetic storage media, and a magnetoresistive transducer, including at least one magnetoresistive element, selectively reading digital data from the magnetic storage media; a first conductor connected to the magnetoresistive element and supplying current to the magnetoresistive element; a second conductor connected to the magnetoresistive element and transporting current from the magnetoresistive element; a control conductor parallel to the magnetoresistive element; and a magnetic feedback stabilization circuit holding the magnetoresistive transducer in a stable magnetic configuration during reading from the magnetic storage media.

9 Claims, 6 Drawing Sheets

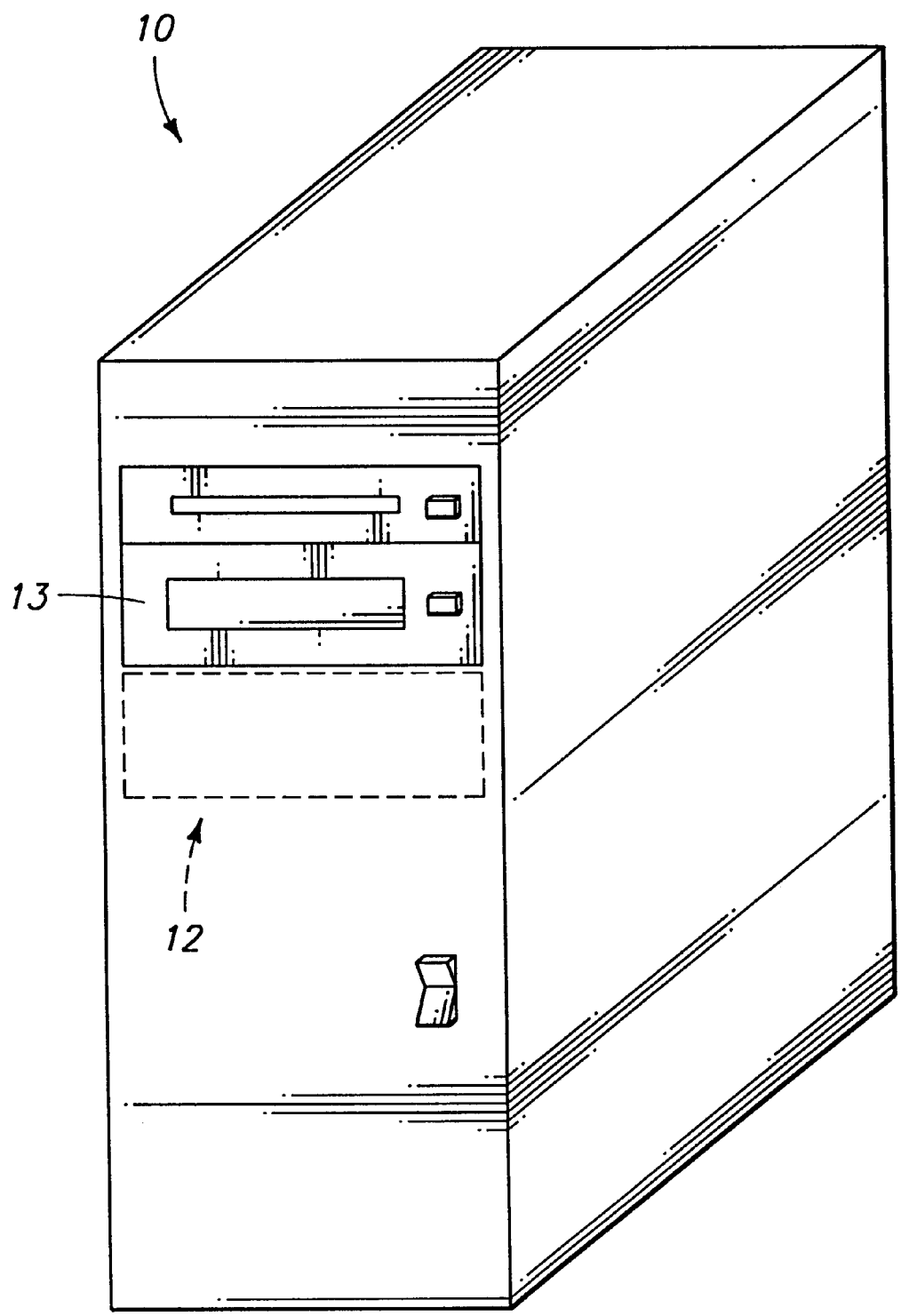
FIG. II

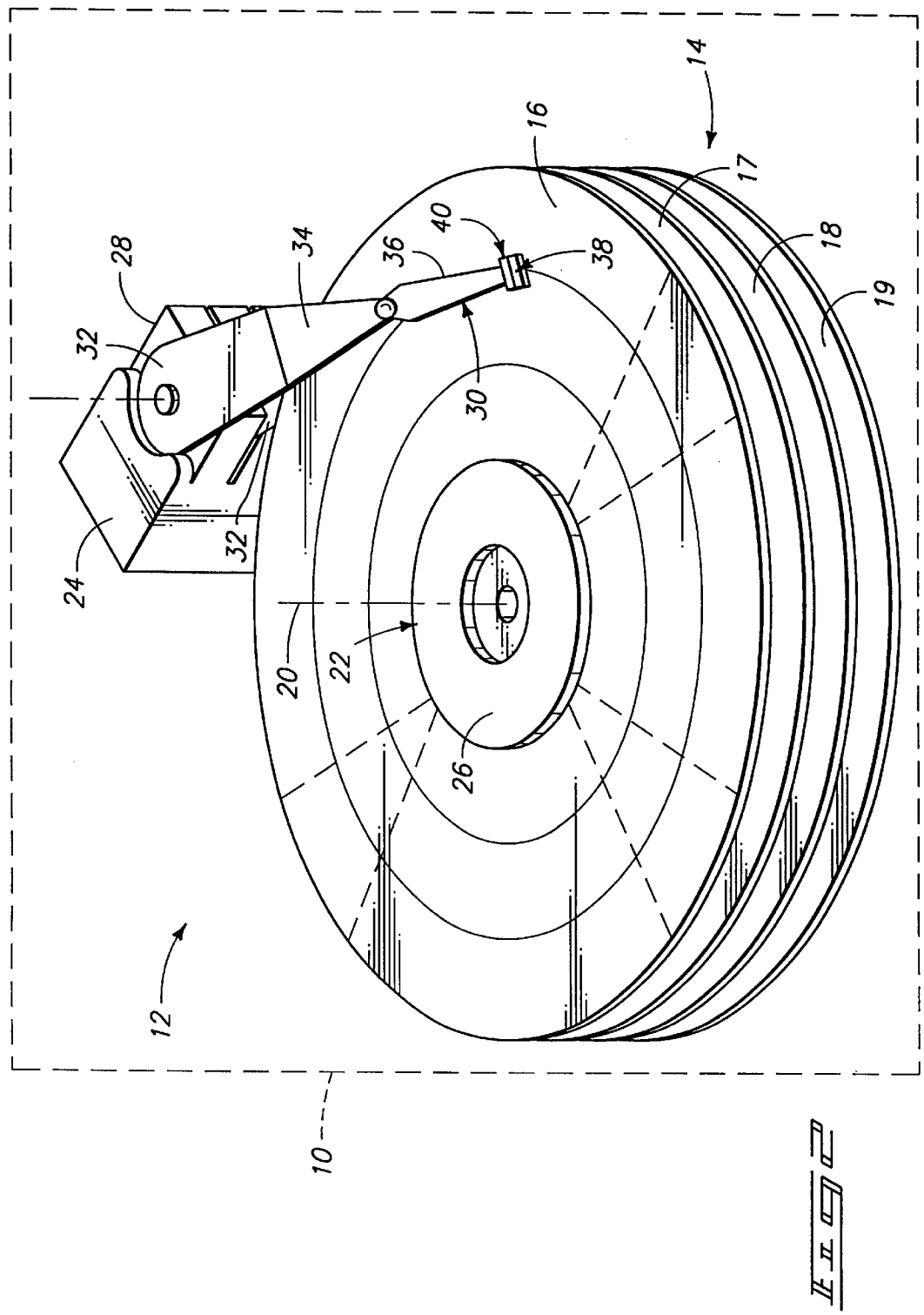

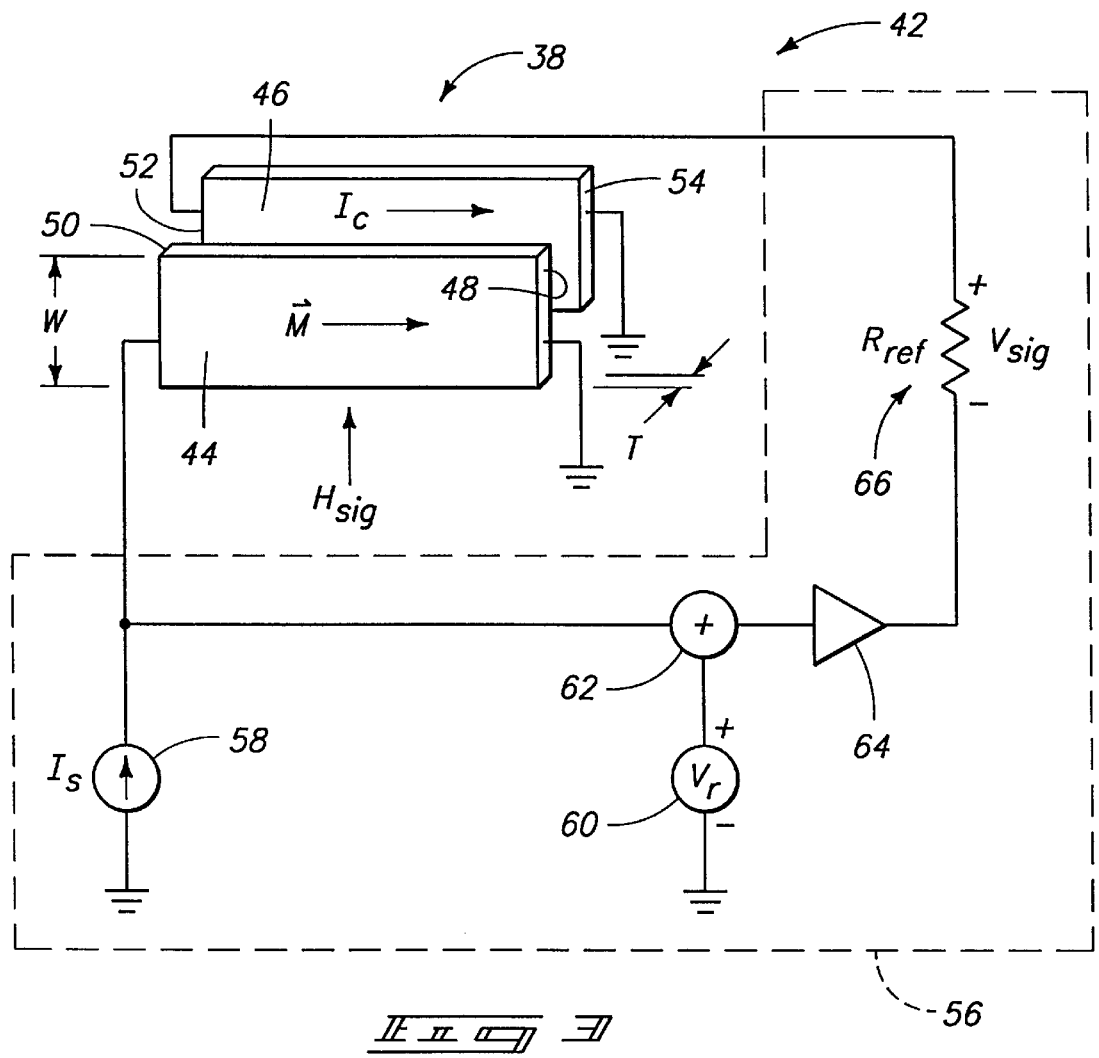
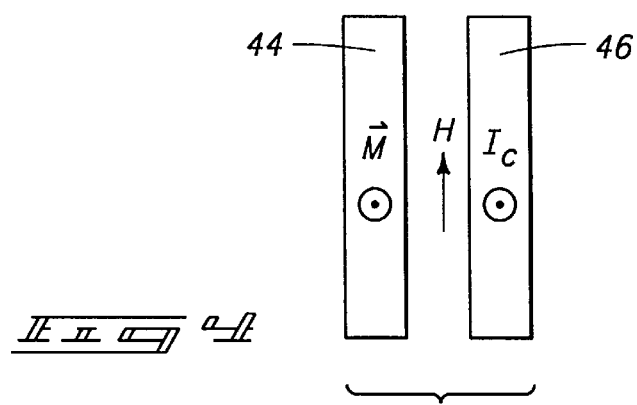

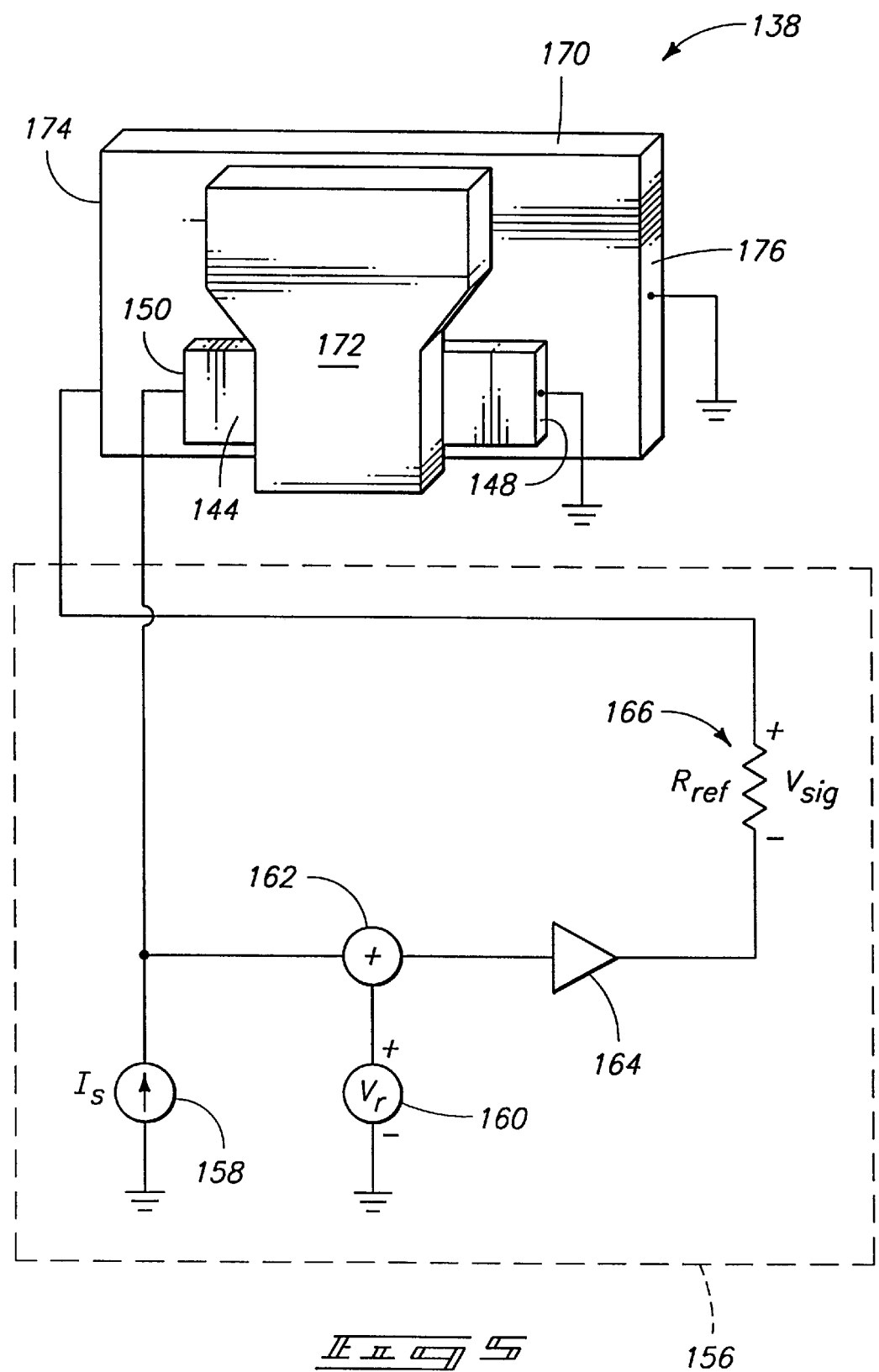

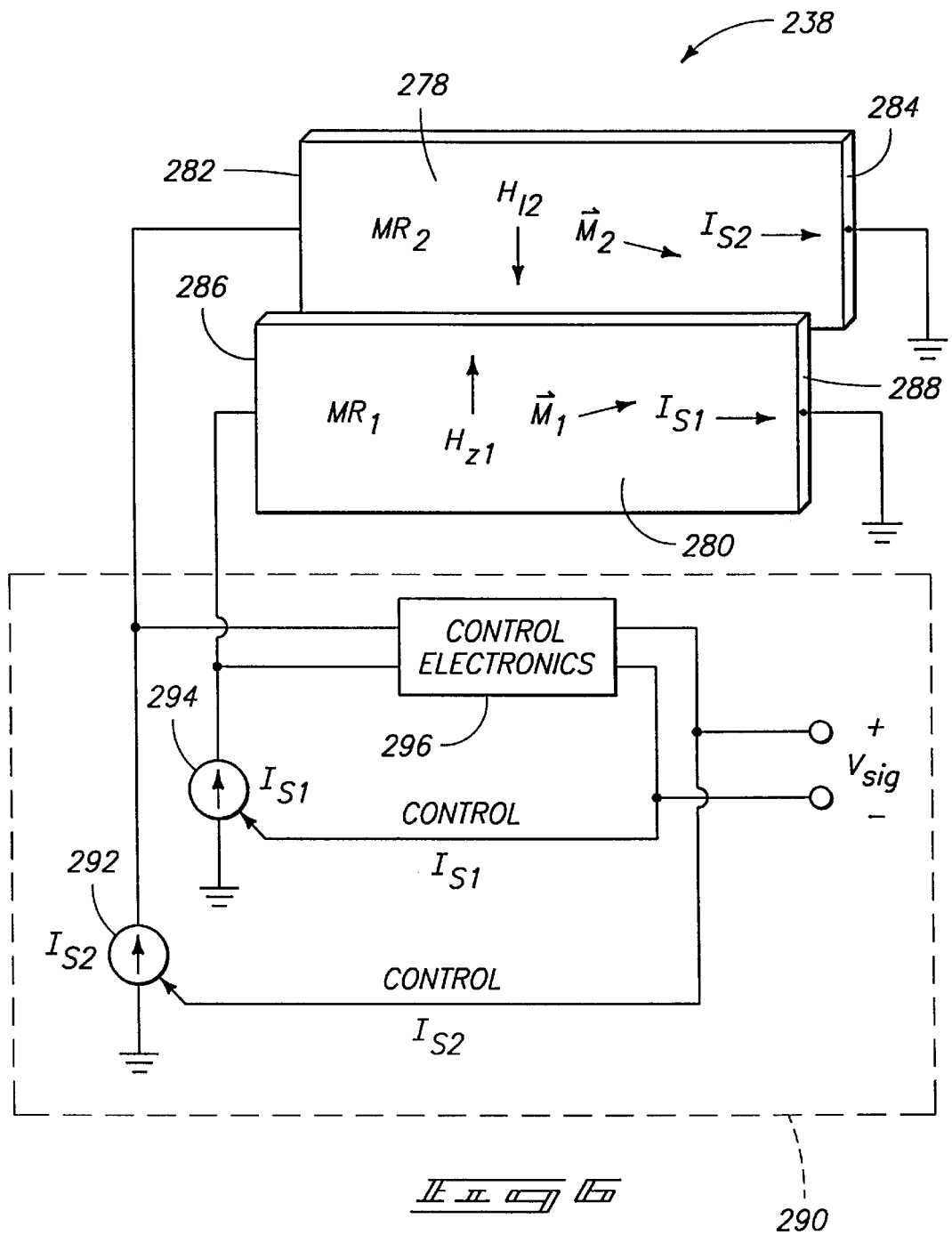

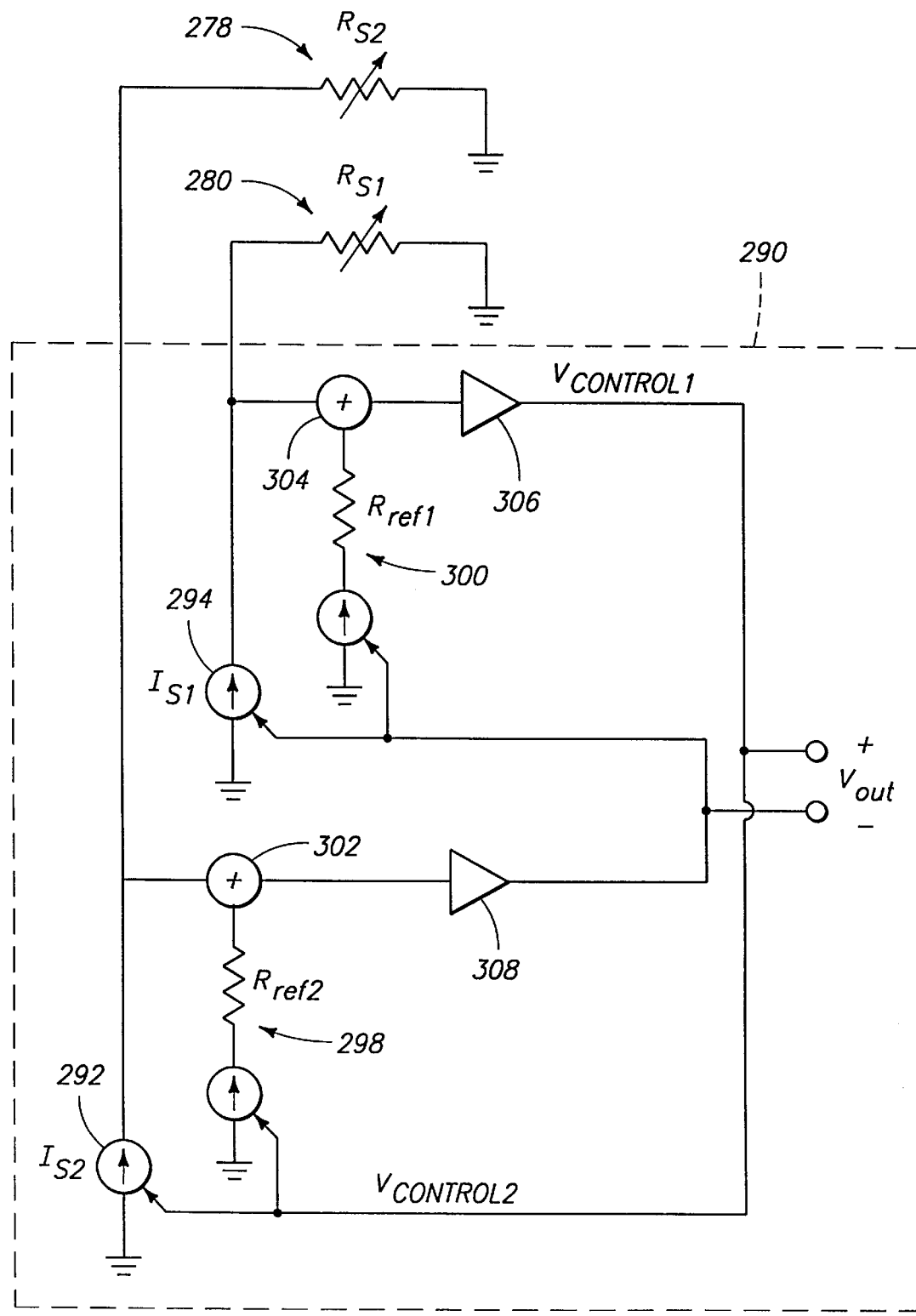

ACTIVELY STABILIZED MAGNETORESISTIVE HEAD

FIELD OF THE INVENTION

This invention relates to magnetoresistive heads. More particularly, the invention relates to stabilization of magnetoresistive heads.

BACKGROUND OF THE INVENTION

Continuing advances in magnetic storage technology provide for constantly increasing data storage densities. It is desirable to reduce the size of transducers used to read or write to magnetic media so that data densities can be increased. Magnetoresistive (MR) heads have been employed to reduce transducer size. Magnetoresistive heads comprise conductive thin films formed on a substrate using techniques similar to those used in manufacturing semiconductors.

A problem with all magnetoresistive heads is unstable magnetic domain states which lead to noise and error rate problems. When a magnetoresistive head is being used to write to magnetic media, or as the media moves relative to the head, a magnetoresistive element included in the head is subjected to external fields that tend to rotate magnetization away from its most stable orientation into orientations that can lead to multiple domain states.

A domain is a group of atoms organized into a bounded region. In each domain, magnetic moments of the atoms in that domain are aligned. Each domain is magnetically saturated and behaves like a magnet with its own magnetic moment and axis. It is undesirable to have multiple domain states in a magnetoresistive element of a magnetoresistive head.

One type of magnetoresistive head is a single stripe magnetoresistive head, which include a single magnetoresistive element. Single stripe magnetoresistive heads are typically shielded by soft magnetic and electrically conductive layers known as top and bottom shields.

One type of magnetoresistive head is a dual-stripe magnetoresistive head (DSMR). A dual-stripe magnetoresistive head includes two spaced apart magnetoresistive elements. Dual-stripe magnetoresistive heads are described in detail in U.S. Pat. Nos. 5,296,987 to Anthony et al.; 5,270,892 to Naberhuis; 5,079,831 to Reid; and 3,860,965 to Voegeli, which patents are incorporated herein by reference.

Another type of magnetoresistive head is a soft adjacent layer (SAL) head. Soft adjacent layer heads have been employed by International Business Machines (IBM) of Armonk, N.Y.

Another type of magnetoresistive head is a giant magnetoresistive (GMR) head. GMR heads are similar to SAL heads. GMR heads are described in detail in U.S. Pat. Nos. 5,446,613 to Rottmayer; and 5,442,508 to Smith, which patents are incorporated herein by reference.

One application for magnetoresistive heads is in analog audio applications. See, for example, a paper titled "Thin-Film Read Head for Analog Audio Application" by W. F. Druyvesteyn, L. Postma, G. H. J. Somers, and J. De Wilde, Philips Research Laboratories. This paper discloses that a main advantage of employing magnetoresistive heads is that photolithographic processing techniques can be used. The paper also describes that, when using a magnetoresistive head, signal is much higher at low frequencies than with an inductive head. Further, in automatic azimuth control audio recorders, where each audio track is read out with two separate heads, magnetoresistive heads provide the advantages of reduced crosstalk and reduced gap scatter. This paper also discusses a concept known as "magnetic feedback," in which a conductive layer is formed under a NiFe magnetoresistive element, and an electric current is passed through the conductor to generate a magnetic field opposite to the excitation field. This decreases distortion and Barkhausen noise.

Barkhausen noise is caused by an effect observed in ferromagnetic materials whereby magnetization proceeds as a series of finite jumps even though magnetizing flux is increased steadily. This happens because spin magnetic moments present in the material can only have certain orientations. The minute jumps correspond to the spin changing from one allowed orientation to another. Barkhausen noise is discussed in U.S. Pat. No. 5,296,987 to Anthony et al.

Construction details of magnetoresistive heads are known in the art, and will not be described in detail herein except as necessary to describe the invention. For example, in addition to the references described above, magnetoresistive heads are described in detail in U.S. Pat. Nos. 5,444,589 to Hu et al.; 5,422,571 to Gurney et al.; 5,442,507 to Koga et al.; U.S. Pat. No. 5,436,778 to Lin et al.; U.S. Pat. No 5,436,777 to Soeya et al.; 5,412,518 to Christner et al; and 5,142,425 to Gailbreath, Jr. et al., all of which are incorporated herein by reference. U.S. Pat. No. 5,309,304 discloses a variety of conductor arrangements that could be employed in various alternative embodiments of the instant invention.

Another application for magnetoresistive heads is in computer memory systems, such as disk drive memory systems of various sizes or formats, or magnetic tape memory systems of various sizes or formats. For example, it is known to employ magnetoresistive heads in computer hard disk drive systems. Conventional computer hard disk drives have a pivoting support arm that movably carries one or more actuator arms relative to one or more corresponding rotatable magnetic disks. Typically, both the top and bottom surfaces of each hard drive are configured to store tracks of information in the form of magnetic media provided on a surface of the hard disk. Therefore, each surface provides a unique data storage device. A support arm is pivoted into position by a rotary servo motor. Each actuator arm extends across the disk to position a magnetic head radially over concentric data tracks in the disk pursuant to position commands received from a drive controller.

The problem of unstable magnetic domain states also exists when magnetoresistive heads are employed in disk drive systems.

SUMMARY OF THE INVENTION

The invention provides a computer comprising a data storage device for use with a magnetic storage media, and a magnetoresistive transducer, including at least one magnetoresistive element, selectively reading digital data from the magnetic storage media, a first conductor connected to the magnetoresistive element and supplying current to the magnetoresistive element, a second conductor connected to the magnetoresistive element and transporting current from the magnetoresistive element; a control conductor parallel to the magnetoresistive element, and a magnetic feedback stabilization circuit holding the magnetoresistive transducer in a stable magnetic configuration during reading from the magnetic storage media.

According to one aspect of the invention, a magnetoresistive head comprises a magnetoresistive element, a first conductor connected to the magnetoresistive element and supplying current to the magnetoresistive element, a second conductor connected to the magnetoresistive element and transporting current from the magnetoresistive element, first and second spaced apart shields on either side of the magnetoresistive element, the shields being formed of conductive material, and a stabilization circuit controllably directing current through one of the shields.

According to another aspect of the invention, a dual stripe magnetoresistive head comprises a first magnetoresistive element, a first conductor connected to the magnetoresistive element and supplying current to the magnetoresistive element, a second conductor connected to the magnetoresistive element and transporting current from the magnetoresistive element, a second magnetoresistive element, a first conductor connected to the second magnetoresistive element and supplying current to the second magnetoresistive element, a second conductor connected to the second magnetoresistive element and transporting current from the second magnetoresistive element, and a stabilization circuit controllably directing current through each of the shields.

DESCRIPTION OF THE DRAWINGS

Preferred embodiments of the invention are described below with reference to the following accompanying drawings depicting examples embodying the best mode for practicing the invention.

FIG. 1 is a perspective view of a computer embodying the invention.

FIG. 2 is a perspective view of a computer disk drive system included in the computer of FIG. 1.

FIG. 3 is a circuit drawing, including a diagrammatical perspective view of a magnetoresistive element and a control conductor of an actively stabilized magnetoresistive head employed in the disk drive system of FIG. 2.

FIG. 4 is a diagrammatical side view of the magnetoresistive element and control conductor of the magnetoresistive head of FIG. 3.

FIG. 5 is a circuit drawing, including a diagrammatical perspective view of a magnetoresistive element, and a shield used as control conductor, of a single stripe magnetoresistive head in accordance with one preferred embodiment of the invention.

FIG. 6 is a circuit drawing, partially in block diagram form, including a diagrammatical perspective view of a magnetoresistive element, and shield being used as control conductor, of a dual stripe magnetoresistive head in accordance with another preferred embodiment of the invention.

FIG. 7 is a more detailed circuit drawing illustrating an equivalent circuit for the circuit of FIG. 6.

DETAILED DESCRIPTION OF THE INVENTION

This disclosure of the invention is submitted in furtherance of the constitutional purposes of the U.S. Patent Laws "to promote the progress of science and useful arts." U.S. Constitution, Article 1, Section 8.

FIG. 1 shows a computer 10 embodying the invention. The computer 10 can be either a personal computer, a mainframe computer, a mini computer, a network server, or any other type of computer. Although the invention is illustrated as being employed in a computer in FIG. 1, the invention has a wide variety of applications. Certain aspects of the invention can be used in connection with any storage media, for storing either analog or digital information. For example, the invention can be embodied in a magnetic tape data storage device, in connection with any of a variety of types of disk storage devices, etc.

The computer 10 includes a disk drive data storage device 12 embodying the invention (FIG. 2), as well as a tape drive data storage device 13 embodying the invention.

The invention will be described primarily in connection with the disk drive data storage device 12, by way of example. The invention is embodied in the tape drive data storage device 13, or in applications other than computer applications, in a substantially similar manner. The disk drive data storage device 12 is shown in greater detail in FIG. 2. The disk drive system 12 includes a stacked array 14 of multiple magnetic hard disks 16–19 aligned substantially along a central axis of rotation 20. The magnetic disks 16–19 have associated, centrally located hubs (referenced generally by numeral 22) and are separated from one another by interposed spacers. The disk drive system 12 further includes a frame 24, and a spindle assembly supported by the frame and carrying the magnetic disks 16–19 for rotation relative to the frame. The disk drive system 12 further includes a motor (not shown) coupled to the spindle and selectively causing the disks 16–19 to rotate about the axis 20. The spindle assembly includes a top clamp 26 for retaining the disks 16–19. The spindle disk drive system 12 includes a support member 28 fixed relative to the frame 24, and a head/arm assembly 30 pivotably supported by the support member 28 for movement relative to the stacked array 14. The disk drive system 12 further includes a motor (not shown) pivotally moving the head/arm assembly 30 relative to the stacked array 14.

The head/arm assembly 30 includes a comb-like array of individual carrier arms 32 carried by the support member 28 and accurately pivoted relative to the support member 28 by the motor. Each carrier arm 32 of the illustrated embodiment is typically of a two-part construction including a first portion 34 defining a proximal end, and a suspension member 36 that is swaged, spot welded, or otherwise fastened to the first portion 34 to define a distal end.

The head/arm assembly 30 includes magnetoresistive heads 38 and 40 supported by the suspension member 36 at the distal end. The disk drive data storage device 12 includes electronic circuitry connected to the head 38 for reading from the upper surface of the disk 16, by reading pulses, and the disk drive data storage device 12 includes electronic circuitry connected to the head 40 for writing to the upper surface of the disk 16. The heads 38 and 40 are housed in a common housing in the illustrated embodiment, but are housed separately in alternative embodiments.

In the illustrated embodiment, one head 38 is employed for reading to a magnetic disk, and a separate head 40 is used for writing to the magnetic disk. However, in alternative embodiments, a combined head is used for both reading and writing.

Only one support arm 32 and head 38 is completely shown in FIG. 2. Other heads 38 are supported by similar support arms 32 aligned directly beneath the upper arm 32 shown in FIG. 2. The support arms 32 are movable relative to the storage disks 16–19 such that positioning of one head 38 likewise positions each respective read/write head 38 and support arm 32. In one embodiment, two heads 38 are supported by each arm 32, one for each side of a disk 16–19. Other details of construction of one disk drive system that could be employed for the disk drive system 12 are provided in a U.S. patent application Ser. No. 08/589,674 titled "Apparatus and Method for Thermal Asperity Detection and Failure Prediction" (attorney docket 10950981-1), naming Bradley K. Davis and Kenneth Eldredge as inventors, assigned to the assignee of the present invention, and incorporated herein by reference.

In the illustrated embodiment, the head 38 is a magnetoresistive head. A magnetoresistive head includes an element that changes in resistance when acted on by a magnetic field.

A problem that magnetoresistive heads of all types suffer, including giant (GMR) heads, is unstable magnetic domain states which lead to noise and error rate problems. As the media moves under the head or when the head is being used in write mode, a magnetoresistive element included in the head is subject to external fields that tend to rotate the magnetization away from its most stable orientation into orientations that can lead to multiple domain states. In accordance with the invention, the magnetization is actively held in a stable configuration.

The magnetoresistive read head 38 is shown in greater detail in FIG. 3. FIG. 3 also illustrates control circuitry 42 included in the disk drive data storage device 12. The head 38 includes a magnetoresistive element 44 and a control conductor 46 parallel to the magnetoresistive element 44, each connected to the control circuit by a conductor (circuit trace) for supplying current thereto, and another conductor (circuit trace) for transporting current therefrom.

The field required to actively hold the magnetization in a stable configuration is provided by the conductor 46. The control circuitry 42 feeds a stabilizing current through the conductor and controls the value of the current to maintain the magnetization in its most stable configuration. The control circuitry 42 provides an error signal which is a copy of the usual read back signal from the head.

The magnetoresistive element 44 has opposite ends 48 and 50 defining a length L. The magnetoresistive element 44 has a length L, width W, and thickness T appropriate for the desired application in which the head 38 will be employed. Any appropriate length, width, and thickness described in the incorporated patents can be employed for the magnetoresistive element 44. Similarly, any appropriate method of manufacture described in the incorporated patents can be employed for the head 38. The end 48 is connected to ground.

The control conductor 46 has opposite ends 52 and 54 defining a length. The end 54 is connected to ground. In the illustrated embodiment, the control conductor 46 has a length, width, and thickness equivalent or similar to the length, width, and thickness of the magnetoresistive element 44. Width is defined along the vertical direction in the views of FIGS. 3 and 5, and thickness is defined as the direction into the page in the views of FIGS. 3 and 5. Preferably, the control conductor is at least as long and as wide as the magnetoresistive element 44, and may be longer, wider, or both longer and wider than the control conductor. The control conductor 46 is preferably a thin film. More particularly, the head 38 is preferably formed by a thin film manufacturing process including steps for forming both the magnetoresistive element 44 and the control conductor 46.

The control circuitry 42 includes circuitry 56 which measures the resistance or electrical resistivity of the magnetoresistive element 44 to determine the magnetization state $\vec{M}$ of the element 44, and controls current flow $I_c$ through the control conductor 46 to attempt to maintain magnetization of the magnetoresistive element 44 in its most stable configuration. The circuitry 56 includes a current source 58 providing a current $I_s$, a voltage source 60, an adder 62, and amplifier 64, and a resistor 66 defining a reference resistance $R_{ref}$. The circuitry 56 employs the following principle:

$$T = (\vec{H}_{sig} + \vec{H}_{control}) \times \vec{M} = 0 \text{ if } \vec{H}_{sig} = \vec{H}_{control}$$

where T is torque, $\vec{H}_{sig}$ is magnetic field intensity at the element 44, $\vec{H}_{control}$ is the magnetic field intensity created by the control conductor 46, and $\vec{M}$ is magnetic potential. Torque is controlled by the circuitry 56 to be zero by causing the magnetic field intensity created by the control conductor to be equal to and in the opposite direction of the magnetic field intensity at the magnetoresistive element 44. FIG. 4 illustrates magnetic field intensity maintained in a stable configuration by the control conductor 46.

In many common implementations of magnetoresistive heads, the magnetoresistive element is shielded by soft magnetic and electrically conductive layers (top and bottom shields) included in the head. These shields can also serve as part of the active magnetic stabilization circuit in the capacity of the control conductor.

FIG. 5 illustrates a magnetoresistive head 138 in accordance with one alternative preferred embodiment, including shields 170 and 172. In the embodiment shown in FIG. 5, the shield 170 serves the same function as the control conductor 46 of the head 38 of the embodiment shown and described in control conductor 46 of the head 38 of the embodiment shown and described in connection with FIG. 3. The head 138 includes a magnetoresistive element 144 having opposite ends 148 and 150 defining a length. The shield 170 has opposite ends 174 and 176 defining a length parallel to the length of the magnetoresistive element 144. Any appropriate length, width, and thickness described in the incorporated patents can be employed for the magnetoresistive element 144. Similarly, any appropriate method of manufacture described in the incorporated patents can be employed for the head 138. The end 148 is connected to ground.

The end 176 of the shield 170 is connected to ground. In the illustrated embodiment, the shield 170 has a length and width greater than the length and width of the magnetoresistive element 144. The distance between the shields and the element 144 is determined by desired readback characteristics for the head, such as how wide the desired readback pulses are to be. The shields 170 and 172 have lengths, widths, and thicknesses as described in the incorporated patents mentioned above. The shields 170 and 172 are formed of conductive materials such as the conductive materials described used for shields described in the incorporated patents. For example, NiFe, or alloys including any of Fe, Co, and Ni can be employed. The shields 170 and 172 are preferably wider than the magnetoresistive element 144. The shields 170 and 172 are preferably thin films. More particularly, the head 138 is preferably formed by a thin film manufacturing process including steps for forming the magnetoresistive element 144 together with the shields 170 and 172.

The head 138 is connected to circuitry 156 which measures the electrical resistivity of the magnetoresistive element 144 to determine the magnetization state of the element 144, and controls current flow through the shield 170 to attempt to maintain magnetization of the magnetoresistive element 44 in its most stable configuration. The circuitry 156 operates in a manner substantially similar to the manner of operation of the circuitry 56, and includes a current source 158 providing a current $I_s$, a voltage source 160, an adder 162, an amplifier 164, and a resistor 166 defining a reference resistance $R_{ref}$.

The embodiment shown in FIG. 5 is advantageous over the embodiment shown in FIG. 4 because there is no need to introduce an additional conductor into the recording gap. Instead, an existing component (a shield) performs dual roles. Because there is no need to introduce an additional conductor, higher recording densities can be achieved.

In one embodiment, shown in FIG. 6, the head is a dual stripe magnetoresistive (DSMR) head having a pair of current-carrying Hall plates. The plates, or stripes change in resistance when acted upon by a magnetic field imparted by regions forming a data track on a disk. Each stripe therefore forms a read head element that senses data on a track being read. The stripes are each formed from a resistor, with the resistor of each stripe being differentially biased by the magnetic field from the current in the other stripe. Depending on the stripe configuration, the magnetic field increases or decreases stripe resistance. For a dual stripe head element, one element increases while the other decreases in resistance, in response to an applied magnetic field.

FIG. 6 illustrates a magnetoresistive head 238 in accordance with another alternative preferred embodiment, including dual magnetoresistive elements or stripes 278 and 280. In the embodiment shown in FIG. 6, the stripe 278 has opposite ends 282 and 284 defining a length. The stripe 280 has opposite ends 286 and 288 defining a length parallel to the length of the magnetoresistive element 144. Any appropriate length, width, and thickness described in the incorporated patents can be employed for the magnetoresistive elements 278 or 280. Similarly, any appropriate method of manufacture described in the incorporated patents can be employed for the magnetoresistive elements 278 or 280. The ends 284 and 288 are connected to ground. The magnetoresistive elements 278 and 280 are formed of conductive materials such as the conductive materials described used for magnetoresistive elements described in the incorporated patents. The head 238 is preferably formed by a thin film manufacturing process including steps for forming the magnetoresistive element 278 together with the magnetoresistive element 280.

The embodiment shown in FIG. 6 is advantageous over the embodiment shown in FIG. 4 because there is no need to introduce an additional conductor into the recording gap. Instead, the magnetoresistive elements perform dual roles. Because there is no need to introduce an additional conductor, higher recording densities can be achieved.

Circuitry 290 causes current to flow through each of the stripes 278 and 280. More particularly, the circuitry 290 includes a voltage controlled current source 292 connected to the end 282 of the stripe 278, a voltage controlled current source 294 connected to the end 286 of the stripe 280, and control electronics 296 adjusting the amount of current respectively supplied to the stripes 278 and 280 to maintain magnetization in a stable configuration.

More particularly, in the embodiment shown in FIG. 6, the magnetoresistive elements 278 and 280 each provide bias fields for the other due to the flow of the sense current supplied by the current sources 292 and 294.

In the embodiment shown in FIG. 6, the sense current for each stripe 278 and 280 is controlled independently and adjusted by the control electronics 296 so as to maintain the magnetization of the stripes in a stable configuration. $H_{21}$ is the bias field in the stripe 278 due to the sense current $I_{s1}$ in the stripe 280, and $H_{12}$ is the bias field in the stripe 278 due to the sense current $I_{S2}$ in the stripe 280, and vice versa.

The control electronics 296 determines the electrical resistivity of each stripe 278 and 280, and uses that information to infer the magnetization state of each stripe using the following relationship:

$$\rho_T = \rho_O + \Delta\rho \cos^2(\theta_{m1} - \theta_{IS1})\theta_{IS1} = O$$

where $\rho_T$ is the total resistivity of stripe 278, $\rho_O$ is the average resistivity, $\Delta\rho$ is the maximum change in resistivity, and $\theta_{M1}$ characterizes the orientation of the magnetization. Thus, control of the dual stripes is performed based on electrical resistivity of each stripe.

The embodiment of FIG. 6 avoids the introduction of an additional conductor into the recording gap. High recording densities can therefore be obtained.

Thus, arrangements for active stabilization for magnetoresistive heads have been provided. Active stabilization will reduce noise and improve linearity of magnetic field versus output voltage for the transducer.

The invention has application with a variety of type of magnetoresistive heads or transducers, including dual stripe designs, and single stripe designs, and for use with a variety of magnetic media, such as magnetic disks or magnetic tapes of various formats or sizes.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A dual stripe magnetoresistive head comprising:

a first magnetoresistive element;

a first conductor coupled to the first magnetoresistive element and configured to supply current to the first magnetoresistive element;

a second conductor coupled to the first magnetoresistive element and configured to transport current from the first magnetoresistive element;

a second magnetoresistive element;

a first conductor coupled to the second magnetoresistive element and configured to supply current to the second magnetoresistive element;

a second conductor coupled to the second magnetoresistive element and configured to transport current from the second magnetoresistive element; and a stabilization circuit configured to controllably direct current through the first magnetoresistive element in response to the resistivity of the second magnetoresistive element, and through the second magnetoresistive element in response to the resistivity of the first magnetoresistive element.

2. A dual stripe magnetoresistive head in accordance with claim 1 wherein the first and second magnetoresistive elements are thin films formed by a thin film processing technique.

3. A dual stripe magnetoresistive head in accordance with claim 1 wherein the stabilization circuit comprises a voltage controlled current source connected to the first magnetoresistive element to supply current to the first magnetoresistive element.

4. A dual stripe magnetoresistive head in accordance with claim 3 wherein the stabilization circuit comprises a voltage controlled current source connected to the second magnetoresistive element to supply current to the second magnetoresistive element.

5. A dual stripe magnetoresistive head comprising:

a first thin film magnetoresistive element;

a first conductor coupled to the first magnetoresistive element and configured to supply current to the first magnetoresistive element;

a second conductor coupled to the first magnetoresistive element and configured to transport current from the first magnetoresistive element;

a second thin film magnetoresistive element;

a first conductor coupled to the second magnetoresistive element and configured to supply current to the second magnetoresistive element;

a second conductor coupled to the second magnetoresistive element and configured to transport current from the second magnetoresistive element; and a stabilization circuit configured to controllably direct current through each of the first and second magnetoresistive elements, the stabilization circuit being configured to measure the electrical resistivity of each of the first and second magnetoresistive elements, infer the magnetization state of each of the first and second magnetoresistive elements from the respective measured electrical resistivities, and adjust the current directed through each of the first and second magnetoresistive elements based on the electrical resistivity of the other magnetoresistive element, the stabilization circuit including a voltage controlled current source coupled to the first magnetoresistive element to supply current to the first magnetoresistive element, and the stabilization circuit including a voltage controlled current source coupled to the second magnetoresistive element to supply current to the second magnetoresistive element.

6. A dual stripe magnetoresistive head comprising:

a first magnetoresistive stripe;

a first conductor coupled to the first magnetoresistive stripe and configured to supply current to the first magnetoresistive stripe;

a second conductor coupled to the first magnetoresistive stripe and transporting current from the first magnetoresistive stripe;

a second magnetoresistive stripe;

a first conductor coupled to the second magnetoresistive stripe and configured to supply current to the second magnetoresistive stripe;

a second conductor coupled to the second magnetoresistive stripe and configured to transport current from the second magnetoresistive stripe; and a stabilization circuit configured to controllably direct current through the respective first and second magnetoresistive stripes, wherein the stabilization circuit is configured to measure the electrical resistivity of the respective magnetoresistive stripes, infer the magnetization state of the respective magnetoresistive stripes from the respective measured electrical resistivities, and adjust the current directed through each of the first and second magnetoresistive elements based on the electrical resistivity of the other magnetoresistive stripe.

7. A dual stripe magnetoresistive head in accordance with claim 6 wherein the first and second magnetoresistive stripes are thin films formed by a thin film processing technique.

8. A dual stripe magnetoresistive head in accordance with claim 6 wherein the stabilization circuit comprises a voltage controlled current source connected to the first magnetoresistive stripe to supply current to the first magnetoresistive stripe.

9. A dual stripe magnetoresistive head in accordance with claim 8 wherein the stabilization circuit comprises a voltage controlled current source connected to the second magnetoresistive stripe to supply current to the second magnetoresistive stripe.

* * * * *

UNITED STATES PATENT AND TRADEMARK OFFICE
CERTIFICATE OF CORRECTION

PATENT NO.    : 5,930,062
DATED         : July 27, 1999
INVENTOR(S)   : Robert J. Davidson It is certified that error appears in the above-identified patent and that said Letters Patent is hereby corrected as shown below:

Column 10,
Line 23, delete "elements" and insert thereof -- stripes --

Signed and Sealed this

Sixteenth Day of November, 2004

JON W. DUDAS
*Director of the United States Patent and Trademark Office*